US011515675B2

(12) United States Patent
Sun et al.

(10) Patent No.: US 11,515,675 B2
(45) Date of Patent: Nov. 29, 2022

(54) ELECTRICAL CABLE ASSEMBLY

(71) Applicant: Cinch Connectors, Inc., Lombard, IL (US)

(72) Inventors: Maurice Sun, Naperville, IL (US); Hecham Elkhatib, Aurora, IL (US)

(73) Assignee: Cinch Connectivity Solutions Inc., Lombard, IL (US)

( * ) Notice: Subject to any disclaimer, the term of this patent is extended or adjusted under 35 U.S.C. 154(b) by 0 days.

(21) Appl. No.: 17/028,512

(22) Filed: Sep. 22, 2020

(65) Prior Publication Data

US 2021/0104845 A1 Apr. 8, 2021

Related U.S. Application Data

(60) Provisional application No. 62/909,531, filed on Oct. 2, 2019.

(51) Int. Cl.
*H01R 13/6592* (2011.01)
*H01R 13/518* (2006.01)
(Continued)

(52) U.S. Cl.
CPC ....... *H01R 13/6592* (2013.01); *H01R 13/518* (2013.01); *H01R 13/5833* (2013.01); *H01R 13/6582* (2013.01); *H01R 13/6588* (2013.01); *H01R 11/32* (2013.01); *H01R 12/772* (2013.01); *H01R 13/516* (2013.01); *H01R 13/5208* (2013.01); *H01R 13/562* (2013.01); *H01R 13/565* (2013.01); *H01R 13/58* (2013.01); *H01R 13/5829* (2013.01); *H01R 13/5841* (2013.01); *H01R 13/5845* (2013.01); *H01R 13/6215* (2013.01); *H01R 13/639* (2013.01);
(Continued)

(58) Field of Classification Search
CPC .......... H01R 13/516; H01R 13/5841; H01R 13/562; H01R 13/5829; H01R 12/772; H01R 13/639; H01R 13/5845; H01R 13/5208; H01R 13/658; H01R 13/565; H01R 24/56; H01R 13/5833; H01R 13/58; H01R 13/6592; H01R 13/518; H01R 13/6582; H01R 13/6588; H01R 13/6581; H01R 13/6591; H01R 11/32; H01R 2201/06; H01R 13/6215; H01R 13/6593; H01R 13/6473; H02G 3/00
USPC .......... 439/456, 466, 468, 470, 473
See application file for complete search history.

(56) References Cited

U.S. PATENT DOCUMENTS 4,619,494 A * 10/1986 Noorily ............ H01R 13/65912
439/607.02

FOREIGN PATENT DOCUMENTS

EP 975060 A1 * 1/2000 ........... H01R 13/506

\* cited by examiner

*Primary Examiner* — Abdullah A Riyami
*Assistant Examiner* — Justin M Kratt
(74) *Attorney, Agent, or Firm* — Leydig, Voit & Mayer, Ltd.; John Augustyn

(57) ABSTRACT

The cable assembly includes a first wire assembly. The first wire assembly is connected to a first connector and a second connector. The first connector includes a shell and the shell includes an extension. The extension extends away from the rear of the connector. In one embodiment, the extension is integral with the shell. The extension includes one or more openings. The first wire assembly is bent in a controlled manner at first bend. The first opening in the extension maintains the first wire assembly in the bent position to maintain control of the radius in first bend. The radius is controlled to allow the first wire assembly to fit in a small space.

19 Claims, 3 Drawing Sheets

(51) Int. Cl.
_H01R 13/6582_ (2011.01)
_H01R 13/6588_ (2011.01)
_H01R 13/58_ (2006.01)
_H01R 13/6591_ (2011.01)
_H01R 13/6581_ (2011.01)
_H01R 13/56_ (2006.01)
_H01R 24/56_ (2011.01)
_H01R 13/621_ (2006.01)
_H01R 13/6473_ (2011.01)
_H01R 13/658_ (2011.01)
_H01R 11/32_ (2006.01)
_H01R 13/516_ (2006.01)
_H01R 12/77_ (2011.01)
_H01R 13/6593_ (2011.01)
_H02G 3/00_ (2006.01)
_H01R 13/639_ (2006.01)
_H01R 13/52_ (2006.01)

(52) U.S. Cl.
CPC ........ _H01R 13/6473_ (2013.01); _H01R 13/658_ (2013.01); _H01R 13/6581_ (2013.01); _H01R 13/6591_ (2013.01); _H01R 13/6593_ (2013.01); _H01R 24/56_ (2013.01); _H01R 2201/06_ (2013.01); _H02G 3/00_ (2013.01)

ELECTRICAL CABLE ASSEMBLY

CROSS-REFERENCE TO RELATED APPLICATIONS

This patent application claims the benefit of U.S. Provisional Patent Application No. 62/909,531, filed Oct. 2, 2019, which is incorporated herein by reference.

BACKGROUND OF THE INVENTION

Electrical cable assemblies are used to connect various electrical and electronic components. In addition, electrical cable assemblies may need to satisfy: electrical characteristics, such as, impedance or EMI leakage; physical characteristics, such as, size or weight; and environmental characteristics, such as, temperature and to seal water, dust and/or moisture. Also, electrical cable assemblies may need to be disconnected from the electrical components. The invention relates to a new cable assembly.

BRIEF SUMMARY OF THE INVENTION

The invention provides a new cable assembly. The cable assembly may include a first wire assembly. The first wire assembly may be connected to a first connector and a second connector. The cable assembly may include a second wire assembly. The second wire assembly may be connected to the first connector and a third connector.

The cable assembly may include wires or conductors. The wires may transmit signals or power. The cable assembly may include fiber optic conductors, or other types of conductors to transmit signals and/or power. The first wire assembly may include a first sleeve. The first sleeve may cover the wires. In addition, the first sleeve may maintain the wires in a bundle. The first sleeve may be made of a material which reduces or eliminates electromagnetic interference (EMI). The second wire assembly may include a second sleeve.

The first connector may include an insulator. The insulator holds the contacts and prevents the contacts from contacting each other. The insulator may be located in a shell. The shell may be made from a material which may provide the EMI shielding.

The shell may include an extension. The extension may extend away from the rear of the connector. In one embodiment, the extension may be integral with the shell. The extension may include one or more openings.

When the first wire assembly is assembled to the connector, the first wire assembly may be inserted into a first opening. The first wire assembly is bent in a controlled manner at first bend. The first opening in the extension maintains the first wire assembly in the bent position to maintain control of the radius in first bend. The radius is controlled to allow the first wire assembly to fit in a small space. In addition, the extension provides wire management for the first wire assembly.

The second wire assembly may be assembled in a fashion similar to the first wire assembly. The second wire assembly may use a second opening. The second wire assembly may be bent in a controlled manner at a second bend. The second opening in the extension maintains the second wire assembly in the bent position to maintain control of the radius in the second bend. The radius is controlled to allow the second wire assembly to fit in a small space. In addition, the extension provides wire management for the second wire assembly.

After the wire assemblies have been assembled to the connector, the connector may include a first layer. The first layer may be located over the insulator. The first layer may be an insulator layer.

The connector may include a second layer. The second layer may be located over the first layer. The second layer may be a conductive layer. The second layer may provide EMI shielding for the rear opening of the shell. The second layer may contact the first sleeve. The second layer may establish a ground path from the first sleeve to the shell. In an embodiment which includes a second sleeve, the second layer may contact the second sleeve. The second layer may establish a ground path from the second sleeve to the shell.

The connector may include a third layer. The third layer may be located over the second layer. The third layer may be an insulator.

DESCRIPTION OF THE INVENTION

Figure 1:
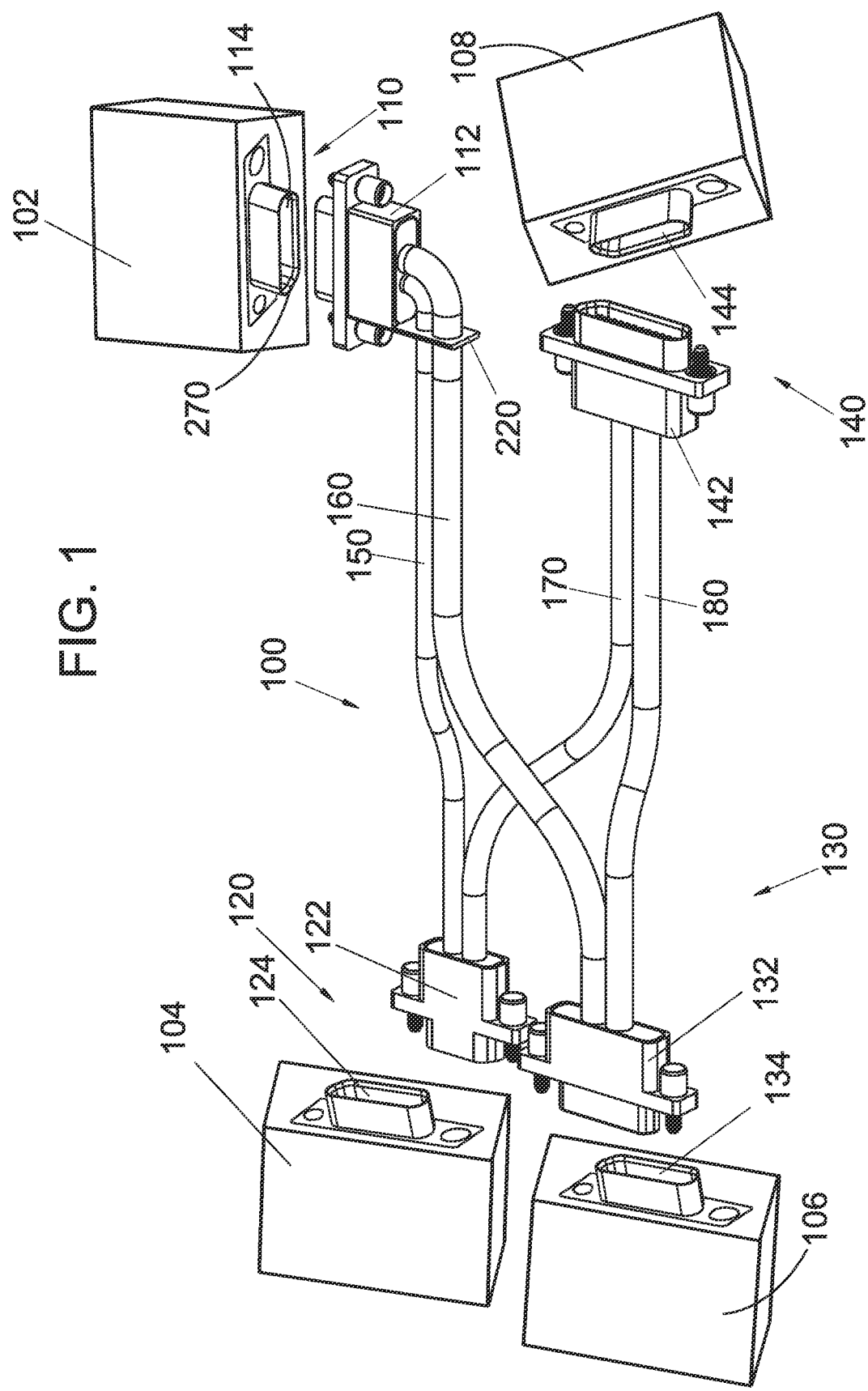
FIG. 1 is a perspective view of one embodiment of the cable assembly attached to components.

Referring to FIG. 1, the cable assembly 100 is shown. In one embodiment, the cable assembly 100 is attached to a first component 102 and a second component 104. In one embodiment, the first component 102 may be a controller. In other embodiments, the component 102 may be receiver, transceiver, or other component. In one embodiment, the second component 104 is a receiver. In other embodiments, the component 104 may be a controller, transceiver, or other component.

In one embodiment, the cable assembly 100 may be attached to a third component 106. The third component 106 may be a controller, a receiver, a transceiver, or other component. In one embodiment, the cable assembly 100 may be attached to a fourth component 108. The fourth component 108 may be a controller, a receiver, a transceiver, or other component.

The cable assembly 100 may be connected to the first component 102 with a first connector pair 110. The first connector pair 110 may include a first connector 112 and a second connector 114.

The cable assembly 100 may be connected to the second component 104 with a second connector pair 120. The second connector pair 120 may include a third connector 122 and a fourth connector 124.

The cable assembly 100 may be connected to the third component 106 with a third connector pair 130. The third connector pair 130 may include a fifth connector 132 and a sixth connector 134.

The cable assembly 100 may be connected to the fourth component 108 with a fourth connector pair 140. The fourth connector pair 140 may include a seventh connector 142 and an eighth connector 144.

The cable assembly 100 may include a first wire assembly 150. The first wire assembly 150 may be connected to the first connector 112 and the second connector 114. The cable assembly 100 may include a second wire assembly 160. The second wire assembly 160 may be connected to the first connector 112 and the third connector 122. The cable assembly 100 may include a third wire assembly 170. The third wire assembly 170 may be connected to the third connector 122 and the seventh connector 142. The cable assembly 100 may include a fourth wire assembly 180. The fourth wire assembly 180 may be connected to the fifth connector 132 and the seventh connector 142.

Figure 2:
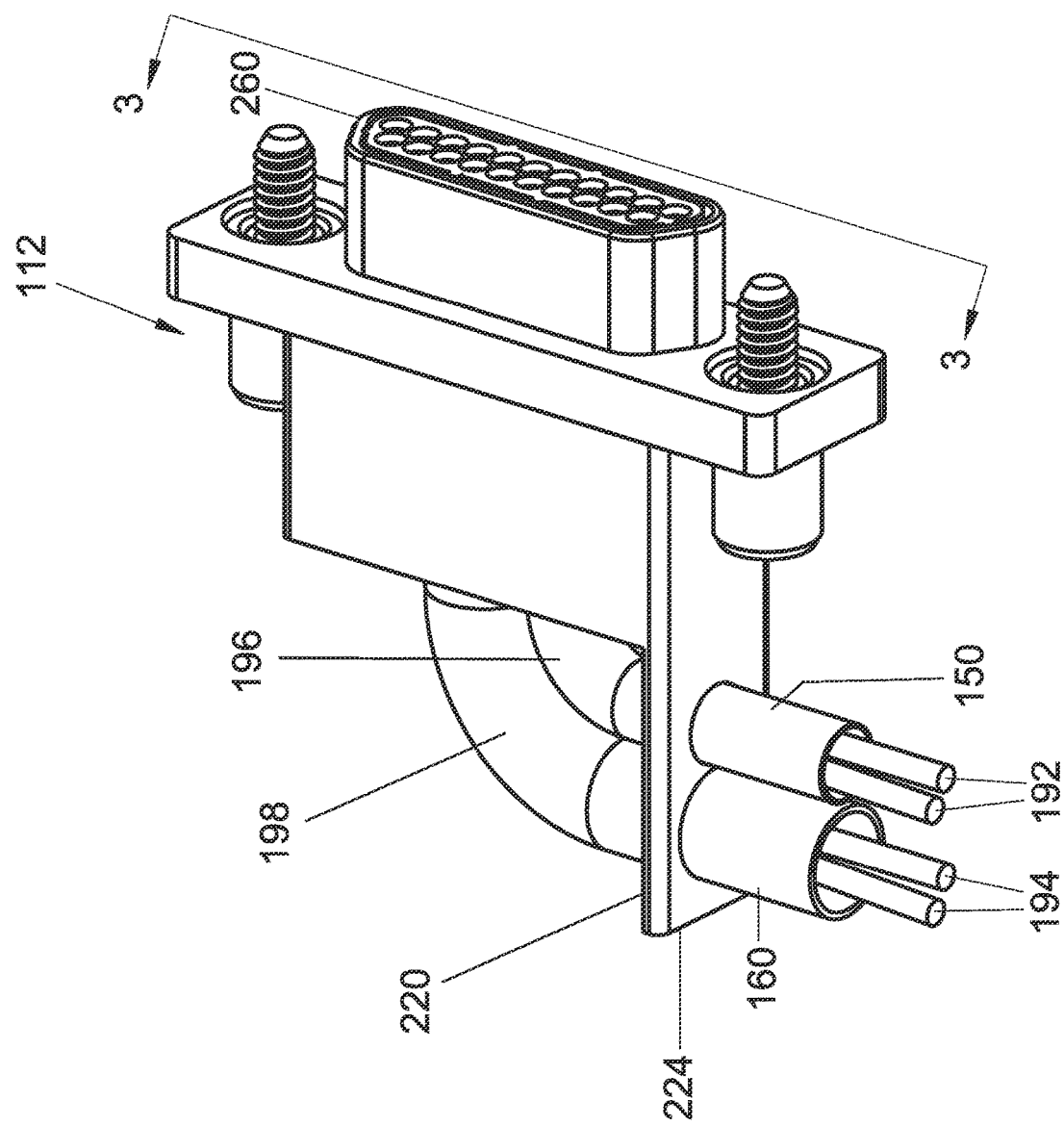
FIG. 2 is a perspective view of a connector and wire assemblies in FIG. 1.
Figure 3:
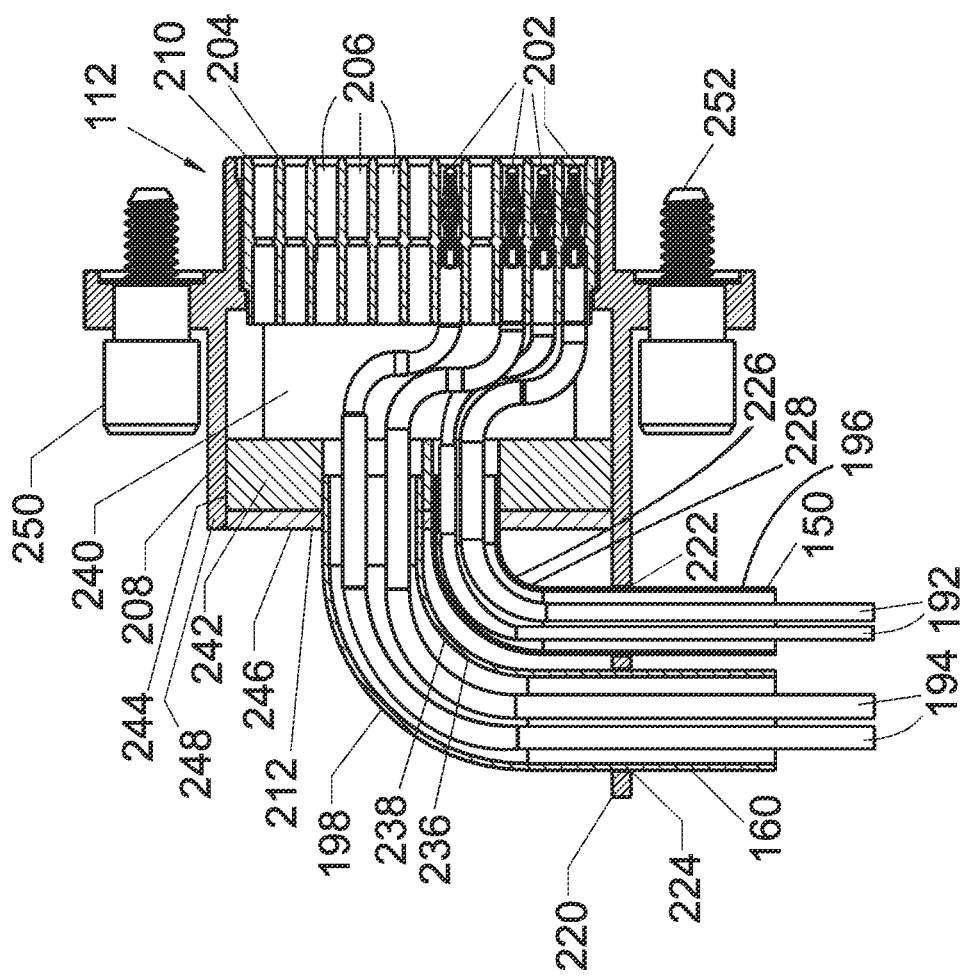
FIG. 3 is a cross-sectional view of a connector and wire assemblies in FIG. 2.

Referring to FIGS. 2 and 3, the cable assembly 100 may include wires or conductors. In one embodiment, the wires may include a conductive portion and an insulation material over the conductive portion. The wires may transmit signals or power. In one embodiment, the cable assembly may include twenty five (25) wires or conductors. In other embodiments, the cable assembly may include 1, 2, 3, 4, 5, 6, 7, 8, 9, 10, 11, 12, 13, 14, 15, 16, 17, 18, 19, 20, 21, 22, 23, 24, 26, 31, 37, 51, 100, or more wires. In other embodiments, the cable assembly may include fiber optic conductors, or other types of conductors to transmit signals and/or power.

In one embodiment, the wires may include a twisted pair of wires. The twisted pair of wires may have a separate shield. The twisted pair of wires and the separate shield are assembled into a shielded twisted wire pair assembly. The shield surrounds the twisted pair of wires. The twisted pair of wires with the shield may provide controlled impedance for the wires.

The cable assembly may include a first wire assembly 150 and a second wire assembly 160. The first wire assembly 150 may include wires 192. The second wire assembly 160 may include wires 194.

In one embodiment, the first wire assembly 150 may have 6 wires. In the embodiment with 6 wires, the wires may include 1, 2, or 3 twisted wire pairs and the remaining wires may be single wires. In other embodiments, the cable assembly may have 1, 2, 3, 4, 5, 7, 8, 9, 10, 11, 12, 13, 14, 15, 16, 17, 18, 19, 20, 21, 22, 23, 24, 25, 26, 31, 37, 51, 100, or more wires. In other embodiments, the second wire assembly 160 may have 14 wires. In the embodiment with 14 wires, the wires may include 1, 2, 3 or more twisted wire pairs and the remaining wires may be single wires. In other embodiments, the cable assembly may have 1, 2, 3, 4, 5, 6, 7, 8, 9, 10, 11, 12, 13, 15, 16, 17, 18, 19, 20, 21, 22, 23, 24, 25, 26, 31, 37, 51, 100, or more wires.

Referring to FIGS. 2 and 3, the wire assembly 150 may include a sleeve 196. The sleeve 196 may cover the wires 192. The sleeve 196 may protect the wires 192. In addition, the sleeve 196 may maintain the wires 192 in a bundle. The sleeve 196 may be made of a material which reduces or eliminates electromagnetic interference (EMI). In one embodiment, the sleeve 196 may be a shielding braid.

In one embodiment, the sleeve 196 does not make contact with the wires 192. The wires 192 may be isolated from the sleeve 196. In one embodiment, a separating layer may be positioned between the wires 192 and the sleeve 196. The separating layer may prevent contact between the wires 192 and the sleeve 196. The separating layer may also isolate the wires 192 from the sleeve 196.

The wire assembly 160 may include sleeve 198. The sleeve 198 may cover the wires 194. The sleeve 198 may protect the wires 194. In addition, the sleeve 198 may maintain the wires 194 in a bundle. The sleeve 198 may be made of a material which reduces or eliminates electromagnetic interference (EMI). In one embodiment, the sleeve 198 may be a shielding braid. In one embodiment, the sleeve 198 may have the same construction as sleeve 196. The wire assembly 160 may include a separating layer as discussed above for wire assembly 150.

The sleeve 196 may provide EMI protection for the wires 192 from the wires 194 in sleeve 198. Also, the sleeve 198 may provide EMI protection for the wires 194 from the wires 192 in sleeve 196.

FIG. 3 is a cross-sectional view of the first connector pair 112 taken along line 3-3 in FIG. 2. Referring to FIG. 3, the first connector 112 may include a contact 202. In one embodiment, the contact may be a pin contact or a female contact. The contact 202 may be attached to a wire. The wire may be one of the wires 192, 194. Wire 192 will be used as an example for the following discussion. The wire 192 may include an insulation material over the conductive portion of the wire. A portion of the insulation may be removed at the location where the contact 202 is attached to the wire. The wire 192 may be attached by crimping the contact 202 onto the portion of the wire without insulation. In another embodiment, the wire may be soldered to the contact. In an additional embodiment, the wire may be attached to the contact by another connection technique.

In one embodiment, the connector 112 may include twenty-five contacts 202. In other embodiments, the connector may have more or less than twenty-five contacts.

The size of the contact 202 depends upon the intended use of the cable assembly. In one embodiment, the contact 202 is sized for use with 26 AWG size wire. In another embodiment, the contact 202 may be sized for use with 24 AWG size wire. In other embodiments, the contact and wire may be larger or smaller than the 30 AWG size.

Referring to FIG. 3, the connector 112 may include an insulator 204. The insulator 204 holds the contacts 202 and prevents the contacts from contacting each other. The insulator 204 may include apertures 206 and the contacts 202 are positioned in the apertures 206. In one embodiment, the insulator 204 may include twenty-five apertures 206. In other embodiments, the insulator may have more or less than twenty-five apertures depending upon the number of contacts. The size of the aperture depends upon the size of the contact 202. In one embodiment, the contact may be retained in the aperture by epoxy. A small amount of epoxy may be applied to hold the contact into the aperture. In one embodiment, the insulator and the contact may include retention features which retain the contact in the insulator in a permanent manner, or non-permanent manner.

Referring to FIG. 1, in one embodiment, the connector 112 may include 21 apertures, the connector 122 may include 15 apertures, the connector 132 may include 25 apertures, and the connector 142 may include 25 apertures.

Referring to FIG. 3, in one embodiment, one or more of the apertures 206 may include a seal plug. In one embodiment, the seal plug may include plastic. In one embodiment, the insulator may have 21 apertures wherein one aperture may include a seal plug and the other 20 apertures may include contacts and wires.

Referring to FIG. 3, the connector 112 may include a shell 208. In one embodiment, the shell may be made of metal. In other embodiments, the shell may be made from other materials which may provide the EMI shielding as discussed herein. In other embodiments, the shell may not provide EMI shielding. The insulator 204 will be positioned inside the shell 208.

Referring to FIG. 3, the shell 208 may include an opening which exposes portions of the insulator 204. The opening in the shell may provide access to the apertures 206 in the insulator 204. Referring to FIG. 3, the shell 208 may include a front opening 210. The front opening 210 provides access to the apertures 206. The shell 208 may include a rear opening 212. The rear opening 212 provides access to the apertures 206.

When the connector is assembled to the wire assembly, the wires from the cable assembly may be inserted into the apertures 206. The contact 202 may be attached to the wire prior to insertion into the aperture 206. In one embodiment, the contact 202 with the attached wire is inserted into the rear of the aperture 206.

The shell 208 may include an extension 220. The extension 220 may extend away from the rear of the connector. In one embodiment, the extension 220 may be integral with the shell 208. For example, the shell 208 and extension 220 may be one piece. In another embodiment, the extension may be made separately from the shell, and the extension may be attached to the shell. In one embodiment, the extension 220 may have a planar construction. In one embodiment, the extension 220 may have a rectangular shape.

The extension 220 may include one or more openings. In one embodiment, the extension may include only one opening 222. In another embodiment, the extension may include opening 222 and opening 224. In other embodiments, the extension may include 3, 4, 5, 6 or more openings. In one embodiment, the opening may be circular. In another embodiment, the opening may be a polygon. In another embodiment, the opening may be C-shaped.

When the first wire assembly 150 is assembled to the connector, the first wire assembly 150 may be inserted into the opening 222. The wire 192 and contact 202 are inserted into the aperture 206 in the insulator 204. The other wires and contacts are also inserted into the respective apertures in the insulator 204. The wire assembly is bent in a controlled manner at bend 226. In one embodiment, the bend may be 90 degrees. In other embodiments, the bend may be 120 degrees, 150 degrees, or any angle between 90 and 180 degrees. The opening 222 in the extension 220 maintains the wire assembly in the bent position to maintain control of the radius 228 in bend 226. In one embodiment, the radius 228 may be 0.072 inches (1.83 mm). In other embodiments, the radius 228 may have a range of 0.072 inches (1.83 mm) to 1 inch (25.4 mm) or more. The radius 228 is controlled to allow the first wire assembly 150 to fit in a small space. In addition, the extension 220 provides wire management for the first wire assembly 150.

The second wire assembly 160 may be assembled in a fashion similar to the first wire assembly 150. However, the second wire assembly 160 may use second opening 224. The second wire assembly 160 may be bent in a controlled manner at second bend 236. In one embodiment, the bend may be 90 degrees. In other embodiments, the bend may be 120 degrees, 150 degrees, or any angle between 90 and 180 degrees. The opening 224 in the extension 220 maintains the wire assembly in the bent position to maintain control of a second radius 238 in bend 236. In one embodiment, the radius 238 may be 0.167 inches (4.24 mm). In other embodiments, the radius 238 may have a range of 0.072 inches (1.83 mm) to 1 inch (25.4 mm) or more. The radius 238 is controlled to allow the second wire assembly 150 to fit in a small space. In addition, the extension 220 provides wire management for the second wire assembly.

After the wire assemblies 150, 160 have been assembled to the connector 112, the connector 112 may include a first layer 240. The first layer 240 may be located over the insulator 204. In one embodiment, the first layer 240 may be an insulator layer. The insulator layer 240 helps to insulate the non-insulated portions of the contacts 202 and the non-insulated portions of the wire 192, 194. In one embodiment, the first layer may be a potted epoxy layer.

In one embodiment, the connector 112 may include a second layer 242. The second layer 242 may be located over the first layer 240. The second layer 242 may be a conductive layer. In one embodiment, the second layer 242 may be a potted conductive epoxy layer. The second layer 242 may provide EMI shielding for the rear opening 212 of the shell 208. The second layer 242 may contact the sleeve 196. The second layer 242 may surround the sleeve 196. The second layer 242 may extend to the perimeter 244 of the opening 212. Thus, the second layer 242 may provide complete EMI shielding for the rear opening 212. In addition, the second layer 242 may establish a ground path from the sleeve 196 to the shell 208.

In an embodiment which includes a second sleeve 198, the second layer 242 may contact the sleeve 198. The second layer 242 may surround the sleeve 198. The second layer 242 may establish a ground path from the sleeve 198 to the shell 208.

In an embodiment which includes three or more sleeves, the second layer 242 may contact the sleeves and may surround the sleeves. The second layer may establish a ground path from the sleeves to the shell 208.

In one embodiment, the connector 112 may include a third layer 246. The third layer 246 may be located over the second layer 242. The third layer 246 may be a cover layer. In one embodiment, the third layer 246 may be an insulator. In one embodiment, the third layer 246 may be a potted epoxy cover layer. The third layer 246 may insulate the second layer 242. In one embodiment, the third layer 246 may be below, parallel to, or above the edge 248 of the opening 212.

In another embodiment, the connector 112 may only include first layer 240 and the first layer may extend to be below, parallel to, or above the edge 248 of the opening 212.

As noted above, when the shielded twisted wire pair assemblies are assembled to the connector, a portion of the shielding near the connector may be removed to expose the wires. Preferably, the least amount of shielding should be removed in order to reduce or eliminate EMI leakage. When the shielding is separated from the shielded twisted wire pair assembly, portions of the wires do not have the shielding. These exposed portions may cause EMI leakage. To reduce the EMI leakage, the shell 208, the sleeves 196, 198 and the second layer 242 enclose the exposed portions of the wires.

The connector 112 may include an attachment mechanism. In one embodiment, the attachment mechanism may be a screw 250. In one embodiment, the screw 250 may be held captive to the connector. The screw 250 may be used to hold the connector 112 to the mating second connector 114. In one embodiment, the attachment mechanism may include a second screw 252. In other embodiments, the attachment mechanism may be a latch, or other attachment mechanism.

The connector may include an orientation feature. In one embodiment, the orientation feature may be the shape of the mating portion 260 of the shell. For example, as shown in FIG. 2 the mating portion 260 may have a "D" shape. The D shape mates with a corresponding shape in the mating connector. In other embodiments, the orientation feature may be one or more keys. The keys may mate with slots in the mating connector. The orientation feature is used to obtain the proper orientation of the connectors during mating.

Referring to FIG. 1, the second connector 114 may be similar to the first connector 112 except for changes to allow the connectors 112, 114 to mate together and the second connector 114 may not include the extension 220. Connector 112 uses male contacts 202 to connect with female contacts in connector 114. The shell 208 of the connector 112 mates with shell 270 of connector 114. The shell 270 may be connected to a ground.

In one embodiment, the third connector 122 may be similar to the first connector 112. The fourth connector 124 may be similar to the second connector 114. The fifth connector 132 may be similar to third connector 122. The sixth connector 134 may be similar to second connector 114. The seventh connector 142 may be similar to the third connector 122. The eighth connector 144 may be similar to the second connector 114.

In another embodiment, one or more of the connectors 122, 132, 142 may include the extension 220.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An electrical cable assembly comprising:
a wire assembly, the wire assembly including:
one or more electrical wires, the electrical wires conduct electrical signals;
a first sleeve covering the electrical wires;
an electrical connector including:
electrical contacts, the electrical contacts conduct electrical signals, the electrical contacts connected to the electrical wires;
an insulator, the insulator holds the electrical contacts;
a shell, the insulator is located in the shell;
the shell includes a rear opening;
the shell provides EMI protection;
the shell includes an extension, the extension extends away from the rear opening, the extension includes a first opening, the wire assembly exits the rear opening of the shell and passes through the first opening of the extension, the first wire assembly has a bend, the bend has a radius, the extension maintains the radius of the bend.

2. The electrical cable assembly as in claim 1, wherein the extension is planar.

3. The electrical cable assembly as in claim 1, wherein the extension is integral with the shell.

4. The electrical cable assembly as in claim 1, wherein the first sleeve provides EMI protection.

5. The electrical cable as in claim 4, wherein the first sleeve is electrically connected to the shell.

6. The electrical cable assembly as in claim 5, wherein the first sleeve is electrically connected to the shell with a conductive layer.

7. The electrical cable assembly as in claim 6, wherein a non-conductive layer is located over the conductive layer.

8. The electrical cable assembly as in claim 1, wherein a non-conductive layer is located over the insulator.

9. The electrical cable assembly as in claim 1, wherein the connector includes an attachment mechanism.

10. The electrical cable assembly as in claim 1, further including a second connector.

11. The electrical cable assembly as in claim 10, further including a third connector.

12. The electrical cable assembly as in claim 1, wherein the extension includes a second opening.

13. The electrical cable assembly as in claim 12, further including a second wire assembly, the second wire assembly including one or more electrical wires, the electrical wires conduct electrical signals, a second sleeve covering the electrical wires, the second wire assembly is located in the second opening.

14. The electrical cable assembly as in claim 13, wherein the second wire assembly has a second bend, the second bend has a second radius, the extension maintains the second radius.

15. An electrical cable assembly comprising:
a first wire assembly, the first wire assembly including:
one or more electrical wires, the electrical wires conduct electrical signals;
a first sleeve covering the electrical wires;
a second wire assembly, the second wire assembly including one or more electrical wires, the electrical wires conduct electrical signals, a second sleeve covering the electrical wires;
an electrical connector including:
electrical contacts, the electrical contacts conduct electrical signals, the electrical contacts connected to the electrical wires;

an insulator, the insulator holds the electrical contacts;
a shell, the insulator is located in the shell;
the shell includes a rear opening;
the shell includes an extension, the extension extends away from the rear opening, the extension includes a first opening, the first wire assembly exits the rear opening of the shell and passes through the first opening of the extension, the first wire assembly has a first bend, the bend has a first radius, the extension maintains the first radius of the first bend,
the extension includes a second opening, the second wire assembly exits the rear opening of the shell and passes through the second opening of the extension, the second wire assembly has a second bend, the second bend has a second radius, the extension maintains the second radius of the second bend;
the shell provides EMI protection;
the first sleeve provides EMI protection;
the second sleeve provides EMI protection;
the first sleeve and second sleeve are electrically connected to the shell.

16. The electrical cable assembly as in claim 15, wherein the extension is planar.

17. The electrical cable assembly as in claim 15, wherein the extension is integral with the shell.

18. The electrical cable assembly as in claim 15, wherein the first opening is circular.

19. The electrical cable assembly as in claim 15, wherein the connector includes an attachment mechanism.

\* \* \* \* \*